March 26, 1957 A. C. CARY 2,786,335
MACHINE FOR MAKING ICE
Filed May 25, 1954 7 Sheets-Sheet 1

Inventor
A. Claxton Cary
by Yardley Chittick
Attorney

March 26, 1957      A. C. CARY      2,786,335
MACHINE FOR MAKING ICE
Filed May 25, 1954      7 Sheets-Sheet 2
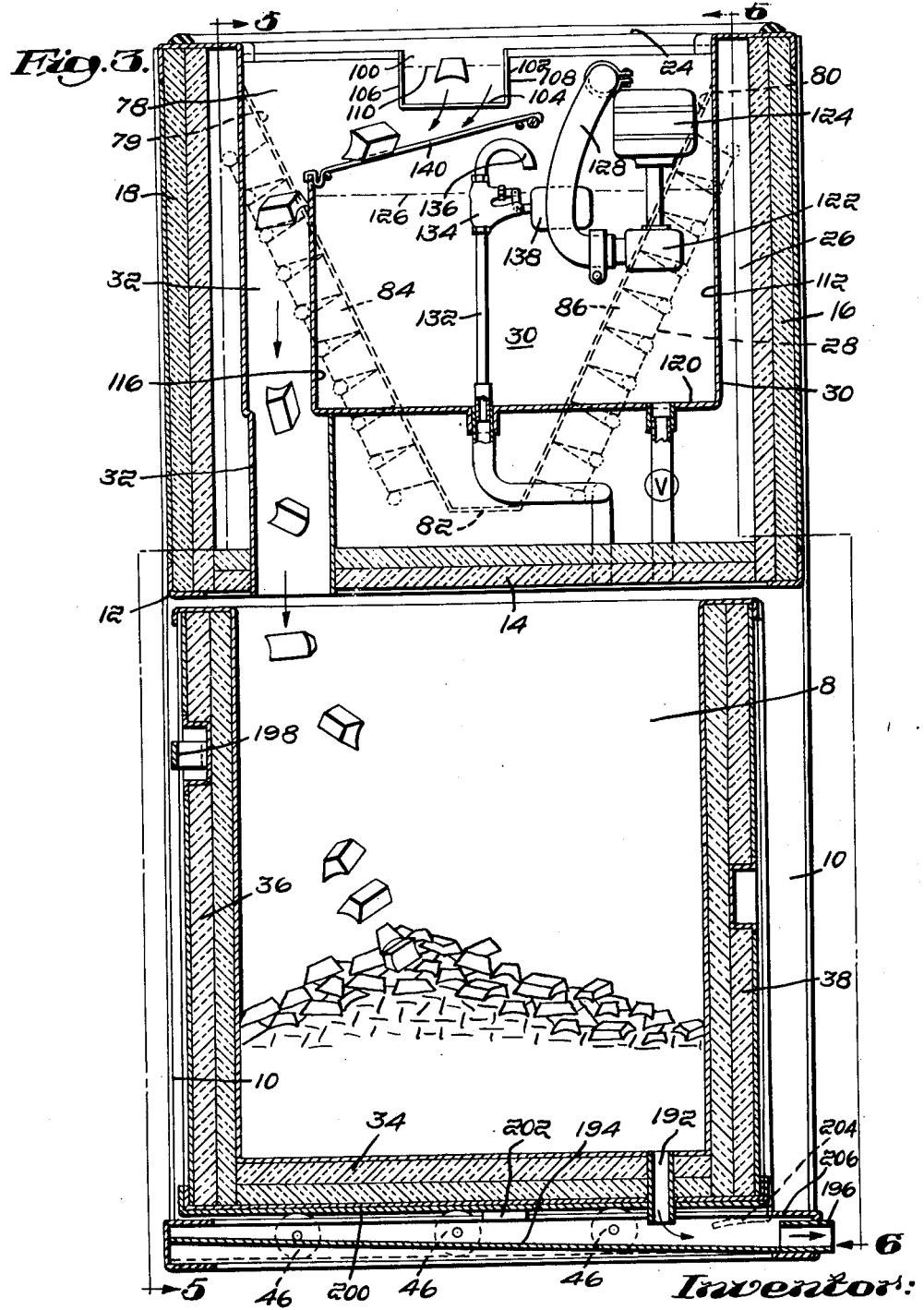

March 26, 1957 A. C. CARY 2,786,335
MACHINE FOR MAKING ICE
Filed May 25, 1954 7 Sheets-Sheet 3
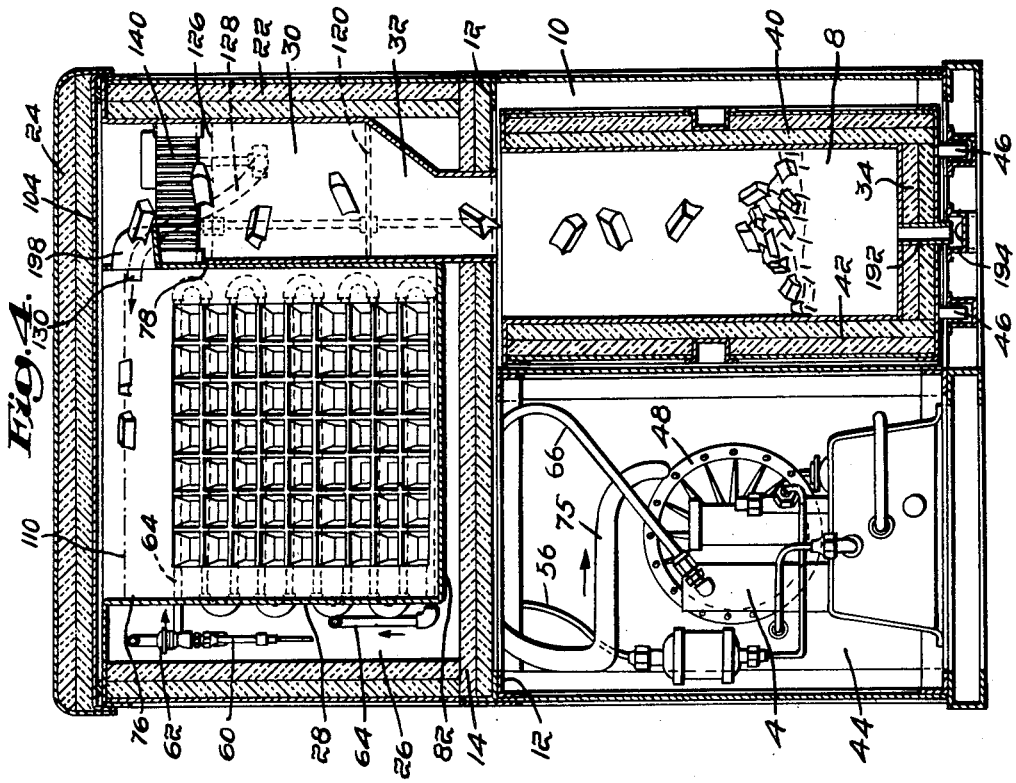
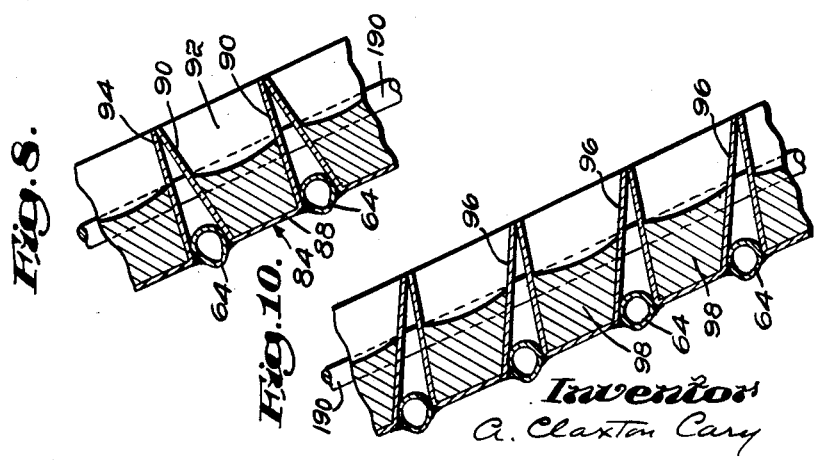
Inventor
A. Claxton Cary
by C. Yardley Chittick Attorney

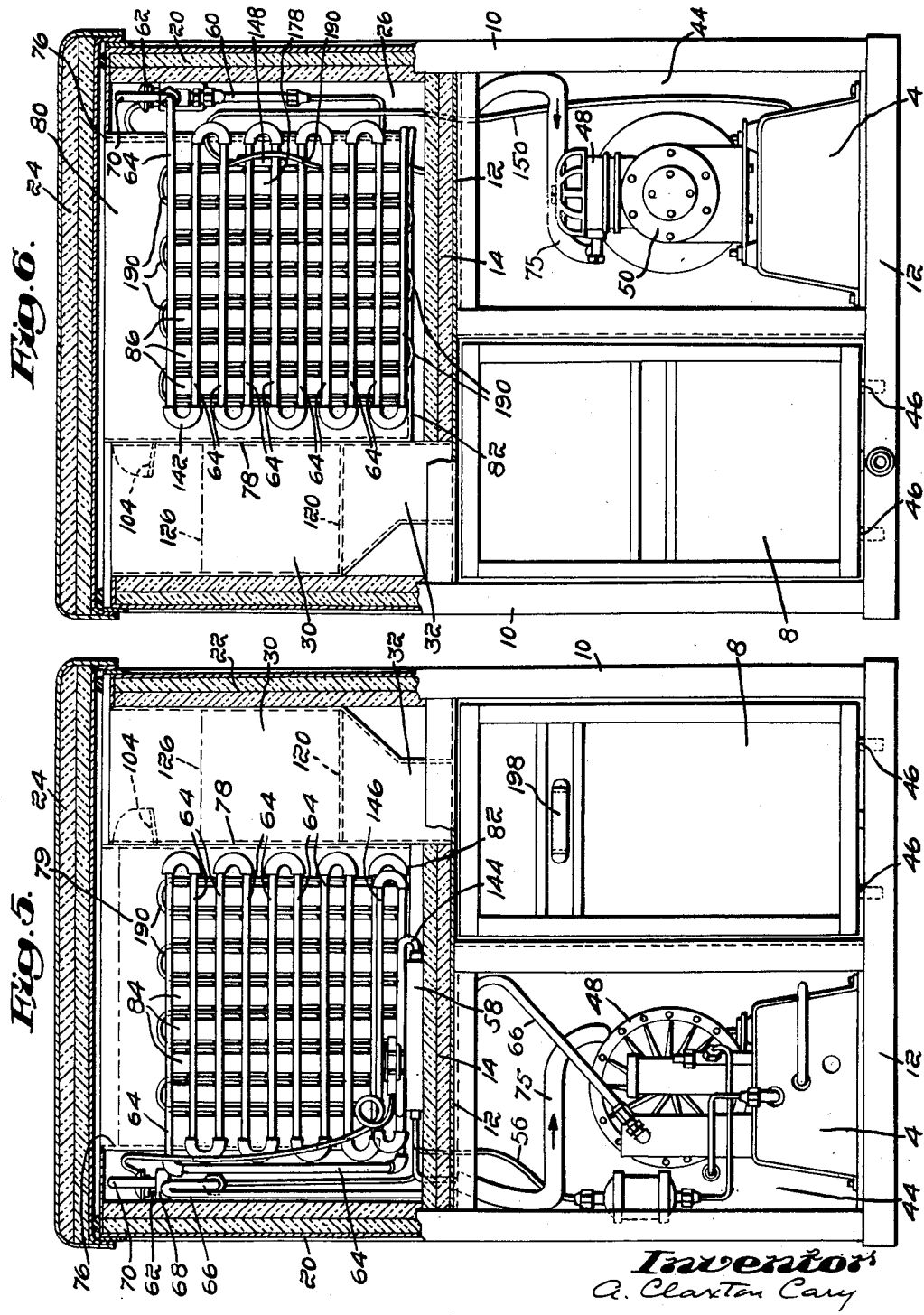

March 26, 1957 — A. C. CARY — 2,786,335
MACHINE FOR MAKING ICE
Filed May 25, 1954 — 7 Sheets-Sheet 5

Inventor
A. Claxton Cary
by C. Yardley Chittick Attorney

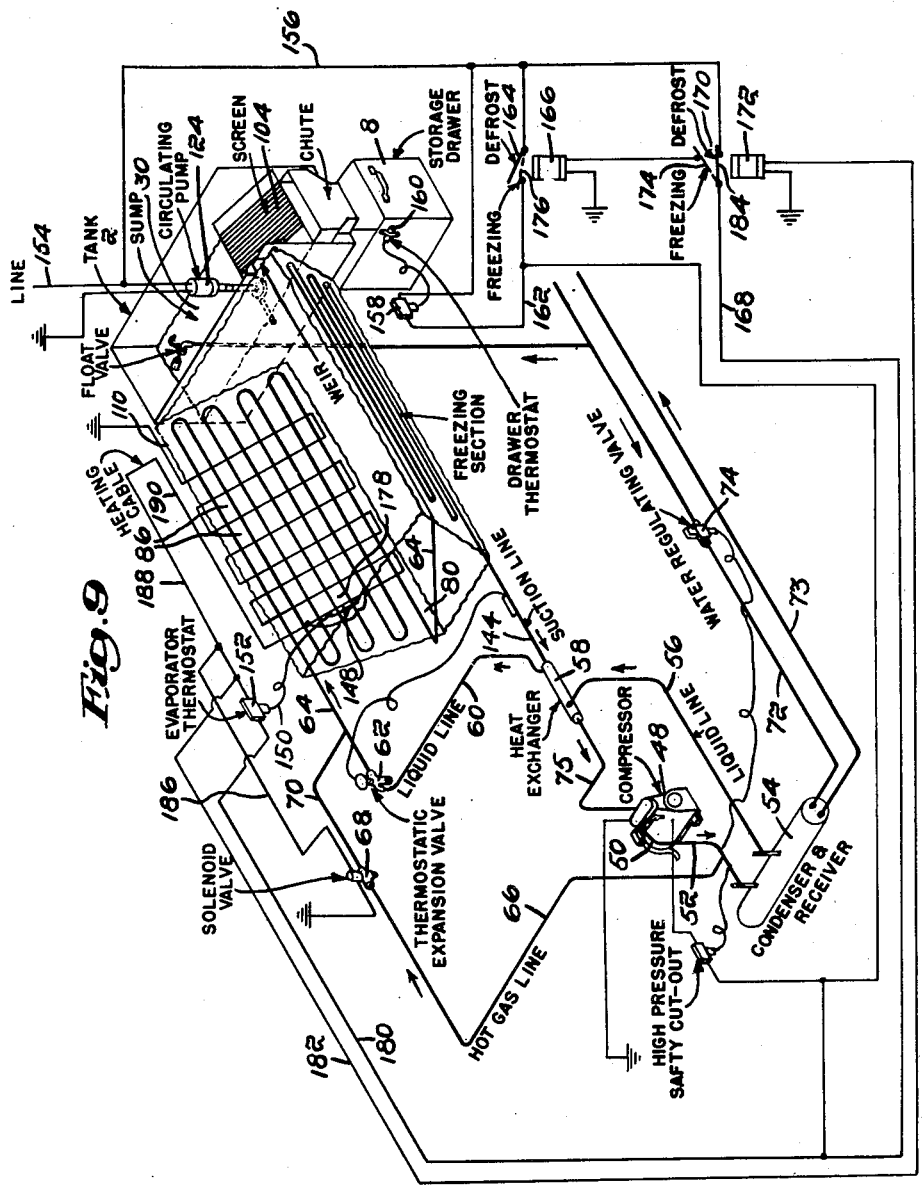

March 26, 1957 A. C. CARY 2,786,335
MACHINE FOR MAKING ICE
Filed May 25, 1954 7 Sheets-Sheet 7

Inventor:
A. Claxton Cary
By C. Yardley Chittick
Attorney

_United States Patent Office_ 2,786,335
Patented Mar. 26, 1957

2,786,335

MACHINE FOR MAKING ICE

Alexander Claxton Cary, Smithfield, R. I., assignor to Hooper, Kimball & Williams, Inc., Boston, Mass., a corporation of Massachusetts Application May 25, 1954, Serial No. 432,192

11 Claims. (Cl. 62—7)

This invention relates to a method of manufacturing ice and a machine capable of carrying out the method of the invention.

Largely due to the development and extensive use of the home refrigerator over the past several decades, the general public has become accustomed to the use of the type and size ice cubes made by these refrigerators in the cooling of drinks. This in turn has resulted in the development of a a demand by restaurants, bars and other public eating and drinking places for similar ice cubes provided in commercial quantity. This need was first met by commercial ice manufacturers who sawed a standard three hundred pound cake of ice into cubes. This process was bound to be expensive and wasteful and as a result other means were sought for the production of ice cubes of conventional form and in commercial quantity which could function as independent ice making units at the point of use. That is to say, a bar, for example, would find it far more convenient to have its own individual ice cube machine on its premises capable of producing ice cubes as needed in the required quantity rather than to be dependent upon the cubes made by independent ice manufacturers.

Ice cube machines suitable for commercial use must necessarily be automatic in operation as it is not practicable for the user in such circumstances to repeatedly fill trays with water to be placed as has been the practice in home refrigeration in freezing compartments. In other words, means must be provided for continuously freezing the ice and then harvesting and storing it in a suitably insulated container until required for use. It is also necessary that means be provided for stopping the continuous freezing process when the storage container is filled and for resuming the freezing cycle automatically when the stored quantity is reduced.

Because of these demands various types of continuous ice making machines have been developed, all of which have had as an objective the continuous production of ice in a form approximating the ice cube made by the house refrigerator. The machines made up to the present time have been unsatisfactory. Accordingly, it is an object of this invention to overcome the defects of the prior art and to produce by continuously operating means ice cubes of acceptable form in commercial quantities as may be required by bars, hotels, restaurants and other public places of like character that require a steady or intermittent supply of ice.

One of the basic difficulties of the pieces of ice formed by other machines now available is that the surface area of the ice is too large in relation to its volume and as a result such ice formations when used to cool liquids melt with excessive rapidity and are therefore to this extent considered undesirable. Ice as produced by existing machines may be in the form of small flat slabs, large flakes or pieces roughly approximating cubes or cylinders on their outer dimensions but having a hole extending therethrough. In all these cases, however, the shape of the ice does not bear any resemblance to the conventional ice cube made in a home refrigerator.

Accordingly, it is an object of this invention to produce in commercial quantities by successive freezing cycles, ice cubes of such volume and dimensions as to approximate the conventional home frozen ice cube and it is a further object of the invention to provide mechanism which may be adjusted to produce ice cubes of greater or less dimension. Thus, for example, if two ounce cubes are required, the machine may be so adjusted. If in other situations smaller pieces of perhaps an ounce and a half are preferred, the machine may likewise be adjusted to give this result.

It is to be understood that when the term ice cube is used, the word "cube" is not to be taken literally for as is known the ice cubes of the home refrigerator are not cubes but merely six-sided polyhedrons. Thus in the present invention the term ice cube means a polyhedron ordinarily having six sides but not limited thereto in which the four surrounding sides are tapered to permit the ready escape of the frozen ice from the freezing cup. The upper surface of the ice cube will be somewhat concave in the ordinary circumstance due to the normal freezing pattern while the bottom of the cube will conform to the bottom of the freezing cup and in the preferred form will be flat. The present invention, however, contemplates that the molds in which the ice is frozen may take any configuration desired so long as the ice when defrosted may escape from the mold and float free.

The present invention contemplates the freezing of ice cubes in cups or molds positioned under water in which the cups form part of the submerged walls of a freezing tank. According to this method, subfreezing temperature is applied to the exterior of the cups and after the temperature of the entire tank of water of which the cups form part of the tank has been reduced to about 32° F., ice commences to form on the interior of the cups and gradually builds up therein to whatever extent is required as determined by the length of the freezing cycle. When the ice has frozen sufficiently to fill the cups to the proper amount, the freezing or refrigerating process is discontinued and heat is then applied to the outside of the cups to cause melting of the surfaces of each ice cube in engagement with its cup, permitting each ice cube to float free of the cup to reach the surface of the water in the tank.

Since the freezing process occurs simultaneously in all of the cups positioned under the water, a quantity of ice cubes equal to the number of cups will be simultaneously formed. The defrosting likewise occurs substantially simultaneously in all of the cups so within a period of a few minutes all of the ice cubes that have just been frozen will be floating on the surface of the tank. Thereafter by automatic means of a new and novel character the ice cubes are harvested by causing them to float over a weir or dam along with the water and then escaping from their normal gravitational course to be delivered to a storage drawer or container. The overflowing tank water, the temperature of which is close to freezing, is not wasted but is collected in a sump and then pumped back into the freezing tank.

Another object of the invention is the provision of mechanism which will stop the operation of the freezing cycles when the collecting drawer has become full of ice, but which will put the freezing and harvesting procedures back into operation as soon as the quantity of ice in the drawer has been reduced either through melting or removal.

Another object of the invention is the provision of novel defrosting means consisting of two types, one of which is piped hot gas for causing defrosting on two of the opposite sides of the freezing cups and the other is an electrical heating element located on the other two opposite sides of the freezing cups.

Another object of the invention is the provision of mechanism which will enable the freezing cycle whenever started to run to completion so that all ice cubes, whether the first batch produced at the start of a renewed cycle of operations or those produced in normal course will be of full normal size.

Another object of the invention is the provision of means for causing continuous circulation and movement of the water in the freezing tank and the freezing cups so that the ice when produced will be clear and free of air bubbles which is the cause of cloudy ice.

Another object of the invention is the provision of a construction which will permit the utilization of conventional refrigeration units which are available on the market in different sizes and which units may be readily incorporated with the other mechanical elements to produce the necessary cold for the freezing cycle and the required heat for the defrosting cycle. These refrigerating units will be related in size to the required quantity of ice to be produced in a given time.

A further object of the invention is the provision of a construction which may be readily modified in dimensions to change the number of ice cubes that will be frozen on each cycle. By simple increase or decrease of the number of freezing cups and the size of the refrigerating unit or evaporator, the number of cubes produced per cycle can be controlled to give the required daily production.

Another object of the invention is the inclusion of a novel type of control means which will insure that the freezing cycle will continue for a time sufficient to produce ice cubes of the intended dimensions and which conversely will continue the defrosting cycle only so long as is necessary to release all of the ice cubes from the cups in which they have just been frozen.

Another object of the invention is the provision of ice cup construction which will permit self-draining of the cups as the water is drained from the freezing tank for cleaning purposes.

Another object of the invention is to provide mechanism which will cause circulation of the water in the freezing tank in such manner as to produce clear ice and to maintain a water level sufficient to carry the ice cubes over the dam in the harvesting period.

Another object of the invention is to provide a construction which will insure overflow of water from the freezing tank into the sump in the event of a blockage of the weir during harvesting of the ice cubes. Another object of the invention is to provide a construction which will be secure against the leakage of water from the freezing tank or sump into the evaporator compartment. As the temperature in the evaporator compartment is considerably below freezing, this area must be kept dry.

Another object of the invention is to provide a construction which will give a large freezing capacity in a minimum of space. Another object of the invention is to provide a sump tank and water level controlled float valve working in combination in such a way as to insure the continuous delivery of water by the sump pump to the tank while at the same time preventing the loss of prime under all circumstances and controlling and restoring the level of the sump supply water as it is depleted by ice removal after formation of the ice cubes in the freezing tank.

Another object of the invention is to provide drain valves in both the sump tank and freezing tank so that the water in both tanks may be simultaneously supplied and drained over a short period of time in a manner adequate to clean both tanks with the sump pump acting as the pumping and circulating means. By this construction fresh clean water may be fed to the freezing tank (while the freezing tank drain valve is open) at such a rate that the normal tank water level will be maintained and, within a limited period, the old water will be completely replaced.

Another object of the invention is to provide an arrangement of freezing coils so located with respect to the freezing cups that all of the cups during the freezing cycle will receive substantially equal quantities of cold whereby all of the ice cubes frozen during the cycle will be of substantially the same size.

Another object of the invention is the provision of refrigerating and defrosting piping so shaped that when affixed to the exterior of the freezing cups maximum cold or heat transference will occur. This construction contemplates noncylindrical pipes which, as shown, are generally oval or egg-shaped in section and the soldering of the pipes to the molds so as to provide maximum heat transference.

Another object of the invention is the provision of piping and valves so arranged that during the defrosting cycle, the compressor will supply hot gas directly to the freezing coils to by-pass the expansion valve through which the compressed gas escapes on the freezing cycle. Another object of the invention is the provision of automatic means which will cause the freezing cycle to run to completion according to the setting provided regardless of the surrounding ambient temperature in which the unit may be placed. By this arrangement the ice cubes produced will be of uniform size whether the unit be in a cold or warm room or in a cold or warm climate. The freezing cycle will be automatically lengthened to offset any loss of cold at the freezing cups because of a higher surrounding atmospheric temperature.

Another object of the invention is the utilization of freezing cups or molds made of low heat conducting metal or other material so that during the defrosting operation, melting will be distributed and a minimum amount of ice will be destroyed before the ice cube is released to float to the surface.

Another object of the invention is to supply defrosting means which will act substantially uniformly on all of the freezing cups so that all of the frozen ice cubes will be released substantially at the same time thereby to terminate the defrosting cycle as quickly as possible. In this way the increase in the temperature of the body of water in the freezing tank and sump during the defrosting cycle will be held to a minimum.

Another object of the invention is to provide an arrangement of the evaporator freezing tank and storage container which will be compact with the ice storage container located within the outline of the overall structure but which may be readily withdrawn from its normal position when ice is to be removed therefrom.

Another object of the invention is to provide means to control a movable storage container in open and shut position so that the container when in out position will not be over balanced or tilted because of the weight of the ice therein.

These and other objects of the invention will become more apparent as the detailed description of the invention proceeds with the aid of the accompanying drawings in which:

Fig. 3 is a vertical section taken on the line 3—3 of Fig. 2 showing the ice cubes coming from the freezing tank on their way to the storage drawer during a harvesting cycle.

Fig. 4 is a vertical section to reduced scale taken upproximately on the line 4—4 of Fig. 2 showing half the tank interior and the harvesting of the ice during a defrosting cycle.

Fig. 5 is a vertical elevation to reduced scale taken approximately on the line 5—5 of Fig. 3 with the door of the compressor compartment removed and the upper panel broken away to show the exterior side of the freezing tank and the freezing cups.

Fig. 6 is similar to Fig. 5 but viewing the unit from the opposite side and taken approximately on the line 6—6 of Fig. 3.

Fig. 8 is a sectional view of a freezing cup and portions of two adjacent cups taken on the line 8—8 of Fig. 2 with the ice frozen therein and prior to the defrosting cycle.

Fig. 9 is a schematic view of the refrigeration mechanism in relation to the freezing tank and sump and shows one form of electrical circuits which may be used to control the institution of the freezing and defrosting cycles.

Fig. 10 is a sectional view of three somewhat modified freezing cups generally similar to those shown in Fig. 8, but which are self-draining when the tank is emptied for cleaning.

Figure 1:
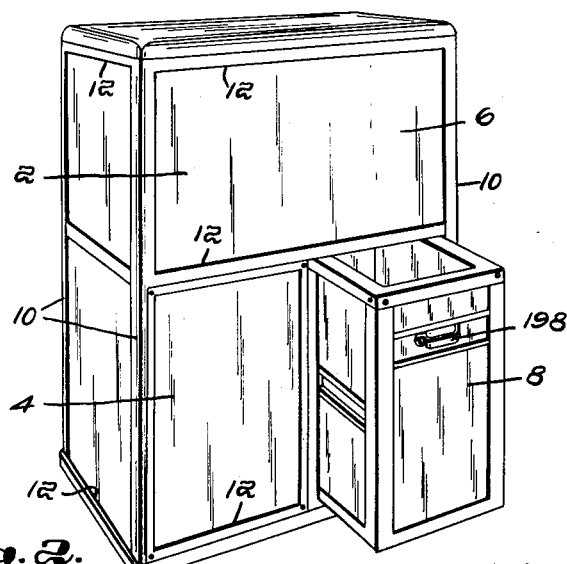
Fig. 1 is a perspective view of a typical ice producing unit made according to the present invention with the ice receiving storage drawer or container shown in open position, ready for the removal of ice therefrom.

Referring first to Fig. 1 so that the general arrangement of the parts of the automatic ice cube making machine may be related to each other, the evaporator section in which is included the freezing tank and ice freezing cups is located generally at 2. The refrigerating or condensing unit is preferably positioned beneath the evaporator as at 4. The water sump and ice delivery passage are positioned at the end of the evaporator as at 6 and the ice receiving and storage drawer is shown at 8. This is not to be considered an inflexible arrangement as it is apparent that other relationships of the elements might be provided, for example, the refrigerating unit might be positioned on the same level as the evaporator section in which case the storage drawer could be enlarged laterally to occupy the entire under area. Accordingly, it will be understood that the arrangement of the essential elements of the machine may be varied as required, but the storage drawer will always be located below the freezing tank as the ice when harvested flows by gravity from the tank to the storage drawer.

Referring to Figs. 2 to 6, it can be seen that the exterior casing is formed by a plurality of structural units such as the vertical angle irons 10 and connecting horizontal angle irons 12 all of which form a rectilinear frame work capable of supporting the various interior mechanisms and the several outer walls that enclose the complete machine. As best seen in Figs. 3, 4, 5 and 6 the angle irons 12 carry a flooring of solid insulating material 14 which along with the vertical insulating material 16 forming the rear wall and 18 forming the front wall and 20 and 22 forming the end walls provides an upper insulated evaporator compartment 26 covered when the machine is in operation by a removable insulated lid 24. Within the compartment 26 so formed is secured the freezing tank 28 and the sump 30. A chute or passageway 32 leads downwardly along the side of the sump to discharge into the storage drawer 8 which also is insulated solidly at its bottom and four sides as at 32, 36, 38, 40 and 42.

Beneath the evaporator compartment 26 is the compartment 44 in which is located the refrigerating unit 4 and which is connected in the usual manner by means which will hereinafter be described to the freezing coils that lie against the exterior of the ice freezing cups that comprise the part of the wall portions of tank 28.

The storage drawer 8 is suitably mounted on anti-friction rollers 46 so that it may be easily drawn out as in Fig. 1 when it is desired to remove ice therefrom.

The refrigerating unit

As shown in Figs. 4, 5, 6 and 7 and schematically in Fig. 9, the refrigerating unit 4 is of conventional design and permits the substitution for use in the present invention of any one of some several standard refrigerating units now being manufactured and sold by various companies specializing in this type of equipment. The unit 4 comprises a compressor 48 driven by motor 50 from which compressed gas is pumped through pipe 52 which extends through the condenser and receiver 54, thence to the liquid line 56 which passes through the heat exchanger 58 where additional heat is removed from the compressed liquid and thence on through liquid line 60 to the thermostatically controlled expansion valve 62. The compressed liquid on passing through expansion valve 62, moves at lower pressure into pipe 64 with a corresponding subfreezing drop in temperature determined by the setting of thermostatic valve 62. The cold fluid, whether gas or a mixture of liquid and gas then flows on through pipe 64 to cool all of the ice cups of the freezing tank 28. The operation of the freezing tank and cups will be explained in more detail hereinafter.

A hot gas by-pass 66 leads from pipe 52 to solenoid valve 68 and thence to pipe 70 leading into pipe 64 beyond the expansion valve 62. This arrangement permits hot gas to be pumped directly from the compressor 48 to pipe 64 during the defrosting cycle.

The condenser and receiver 54 is supplied with cooling water by pipe 72 and the heated water is discharged to the waste drain through pipe 73. The flow of cooling water is controlled automatically by the operation of the water regulating valve 74 which is influenced by the temperature of the hot compressed gas in pipe 52.

A suction line 75 connecting with the discharge end of pipe 64 carries the refrigerating fluid from which the cold has been extracted by its passage through pipe 64 about the freezing cups of tank 28 back to compressor 48 passing on its way through heat exchanger 58 which causes an increase in temperature of the returning fluid in line 75 and a decrease in temperature of the liquid passing through lines 56 and 60 on its way to the expansion valve 62.

Accordingly, during the freezing cycle in which solenoid valve 68 is closed, low temperature fluid will reach the cooling coil 64 through expansion valve 62. During the defrosting cycle, solenoid valve 68 will be open and accordingly, hot gas will flow directly from the compressor to pipe 64 through pipes 66 and 70 instead of through the expansion valve 62. Thus, with the compressor operating continuously, the system can be changed from a freezing to a defrosting cycle by opening solenoid valve 68 and changed back again to a freezing cycle by closing solenoid valve 68. The controls that actuate solenoid valve 68 will be explained hereinafter.

The evaporator or freezing unit

The freezing unit comprises a generally V-shaped tank 28 having end walls 76 and 78 which extend substantially to the top of the unit and the upper edges of which may be engaged by the lid 24 when the latter is in place. End wall 76 is spaced from the insulation 20 so as to provide room for the necessary piping and valves associated with the compressor or refrigerating unit 4. The sides of the freezing tank 28 as at 79 and 80 are sloping and meet together with the end walls to be secured to the bottom 82. The slope of the side walls 79 and 80 may be varied. The intention is to provide as many freezing cups as possible in a given sized tank with the cups' walls arranged so that the ice cubes may free themselves after defrosting. With these considerations met, it will be appreciated that walls 79 and 80 could be vertical and fairly close together.

Figure 2:
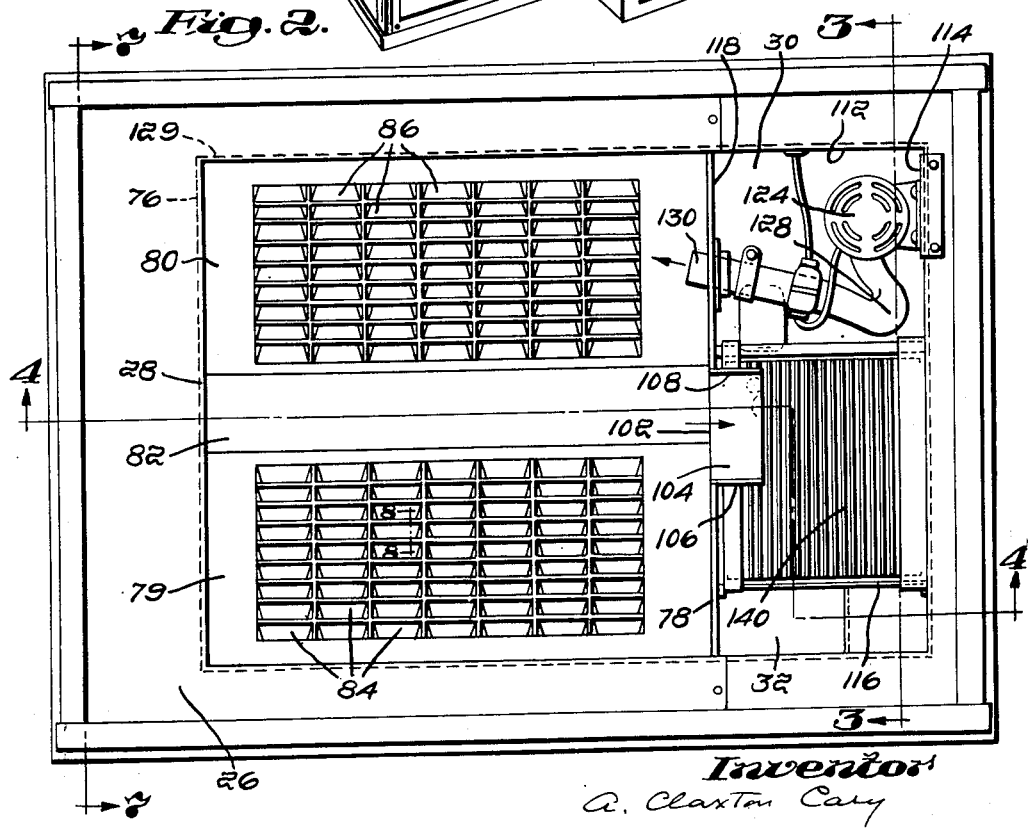
Fig. 2 is a plan view of Fig. 1 with the top lid removed therefrom to show the freezing tank and ice freezing cups therein, the sump, weir, pump motor and supply line through which water is pumped from the sump to the freezing tank.

Each of the walls 79 and 80 includes therein a large number of individual ice freezing cups or molds, 84 and 86 respectively, one of which is shown in Fig. 8 a view taken on the line 8—8 of Fig. 2. In the preferred practice, there will be nine cups extending vertically and as many cups longitudinally as are needed to provide the necessary ice output. As shown in Fig. 2, there are seven cups in each longitudinal row and there are nine cups in each vertical row giving a total of sixty-three cups on each side or a total of one hundred and twenty-six cups in the tank 28. This means that one hundred and twenty-six ice cubes will be frozen simultaneously and, upon defrosting, all of these ice cubes will float to the top of the water which fills tank 28 and immediately thereafter will be harvested by means which will be explained shortly.

The ice freezing cups or molds that are in the sloping wall 78 are numbered 84 and the cups in sloping wall 80 are numbered 86. Each of these cups is shown as having a flat bottom and four outwardly sloping walls, one of such cups 84 being shown in Fig. 8 with the bottom numbered 88, two of the facing walls numbered 90 and the other two facing walls numbered 92. These cups are made preferably of stainless steel having relatively low heat conductivity and are ordinarily formed from a suitably died out piece of stainless sheet steel permitting the four walls to be folded upwardly to form the cup. The adjacent edges of the cup walls are welded on their exterior so as to leave the cup perfectly smooth on its interior thereby to insure that there will be no obstruction present when the ice cube seeks to float free after being defrosted. Each of the upper edges of the four sides of each cup is welded as at 94 (see Fig. 8) to the corresponding edge of the next adjacent cup. In this way all of the sixty-three cups 84 and sixty-three cups 86 are welded together about all four edges and also to the interior edges of the opening in walls 79 and 80 in which the grouped cups are secured to form two completely water-tight walls of the tank 28.

By lengthening the walls 79 and 80, additional cups may be added in the longitudinal direction thereby to increase the ice producing output of the machine. It will be understood that as the number of cups is increased, the capacity of the refrigerating mechanism 4 must be correspondingly increased, but this is readily accomplished as refrigerating equipment is available in various capacities adequate to take care of the freezing of any desired number of ice cubes in a given cycle within all reasonable time requirements.

The slope of the walls 79 and 80 and divergence of the cup walls is such that once the defrosting has proceeded far enough to loosen the ice cube from the cup over its entire surface, the ice cube will immediately slide upward and out of the cup to float to the surface of the water in the tank.

In order to facilitate draining and cleaning of the tank and cups, the cups may be formed as shown in Fig. 10. In this arrangement the bottom side 96 of each cup 98 slopes slightly downwardly as distinguished from the upward slope of lower wall 90 shown in Fig. 8. In the construction shown in Fig. 10, when the tank is drained of water, the water will run out of each cup whereas in the construction of Fig. 8, a small amount of water would remain in each cup which would require removal by other means. The ice formed in the cups 98 in Fig. 10 would not be as symmetrical as the cubes coming from the cups of Fig. 8, but this is not objectionable because the ice would still be a solid polyhedron and equally clear.

Particular attention is called to the end wall 78 of tank 28 in which there is a notch 100 to provide a weir or dam 102 over which water continually flows during the operation of the machine. Extending away from the wall 78 is a plate 104 which slopes slightly upwardly as can be seen in Figs. 4, 5 and 6. Side members 106 and 108 are also provided to insure a straight run of water over plate 104.

As can be seen in Figs. 3, 4, 5 and 6, the water level is maintained at 110 which is high enough above the bottom of the weir 102 and the upwardly sloping plate 104 so that any ice cubes caught in the stream of water flowing out of the tank will be carried with certainty over the weir to be deposited in a manner subsequently to be explained, in the storage drawer 8.

*Water circulation system*

Adjacent tank 28 and arranged in water tight relation thereto is the sump 30 which as shown in Fig. 2 has the walls 112, 114, 116 and 118. The bottom of the sump is indicated at 120 in Figs. 3, 4, 5 and 6. Positioned in the sump is a water pump 122 driven by an electric motor 124 of very small capacity, preferably $\frac{1}{40}$ horsepower, however, which is of sufficient strength to lift the water from the normal water level 126 of the sump to the water level 110 of tank 28. The water flows from the sump to the freezing tank upward through hose 128 and is ejected into the freezing tank from the end of pipe 130. This pipe is aimed approximately, as can be seen in Fig. 2 toward the right far corner 129 of the tank 28 in such manner that the surface water will be caused to circulate in a generally rotary fashion counterclockwise. Not only will the surface of the water be circulated, but there will be continuous movement induced in all portions of the water throughout the tank so that the water in all the cups 84 and 86 will be in constant movement during the entire freezing cycle. It is this constant movement of the water in the cups while freezing is going on that results in perfectly clear ice.

As shown in Fig. 3 the end 130 of pipe 128 is located at or just under the surface of the water and the velocity of the stream is great enough to cause sufficient circular movement of the water to insure the carrying of each cube to the weir.

The capacity of pump 122 is such that the water level 110 in tank 28 will be maintained constant with a head above the weir sufficient to insure that the ice cubes picked up by the circulating surface water during the harvesting operation will be carried with certainty over the weir and the slightly upwardly sloping plate 104. In other words the dimensions of the weir and the character of the movement of the water at the surface of the tank insure that there can be no ice jams at the weir and that within a very short period, not more than two or three minutes, any ice cubes floating on the surface of the tank water will have been carried over the dam.

Agitation of water by a pump causes a rise in temperature, the rise being proportional to the work done on the water. Accordingly, it is important that the motor 124 be of a small horsepower as possible while still being able to pump water in sufficient quantity from the sump to the tank so that the heat imparted to the water by the operations of the pump will be as little as possible.

A water supply pipe 132 connected with an exterior water source leads to a float controlled valve 134, which when open allows water to feed into the sump through the pipe 136. Valve 134 is controlled by the position of float 138. The sump water level 126 falls as the ice cubes are being harvested, the drop in level being equal to the volume of the ice cubes removed from the water, but the level 110 in the freezing tank remains constant because the quantity of water being pumped from the sump to the freezing tank by pump 122 is a constant amount regardless of the sump level. As the sump level 126 falls as the cubes are harvested, valve 138 opens for the period required to bring the sump water level back to normal.

Positioned over that part of the sump 30 into which the water from weir 102 is constantly falling, is a screen 140 shown in the form of a plurality of parallel spaced wires or small bars and sloping downwardly to the left as viewed in Fig. 3. As the water and ice cubes come over the weir 102 and plate 104 during the harvesting cycle, the water falls through the screen 140 into the sump while the ice cubes engage the screen and slide sideways thereon to enter the upper part of the chute 32 through which they fall to enter the storage drawer 8.

During the freezing cycle, the levels of the water in the freezing tank 28 and the sump 30 remain constant. On the defrosting cycle, the harvesting of the ice cubes results in water depletion equal in amount to that water from which the cubes have been frozen and this loss of water is automatically replaced by actuation of the float controlled valve 134. The amount the water level 126 falls during the harvesting operation will not be enough to bring the water level below the pump 122 and consequently there will be no loss of prime in the pump which could occur however if pump 122 were located too close to the normal sump surface 126.

*The evaporating mechanism as applied to the freezing cups*

Figure 7:
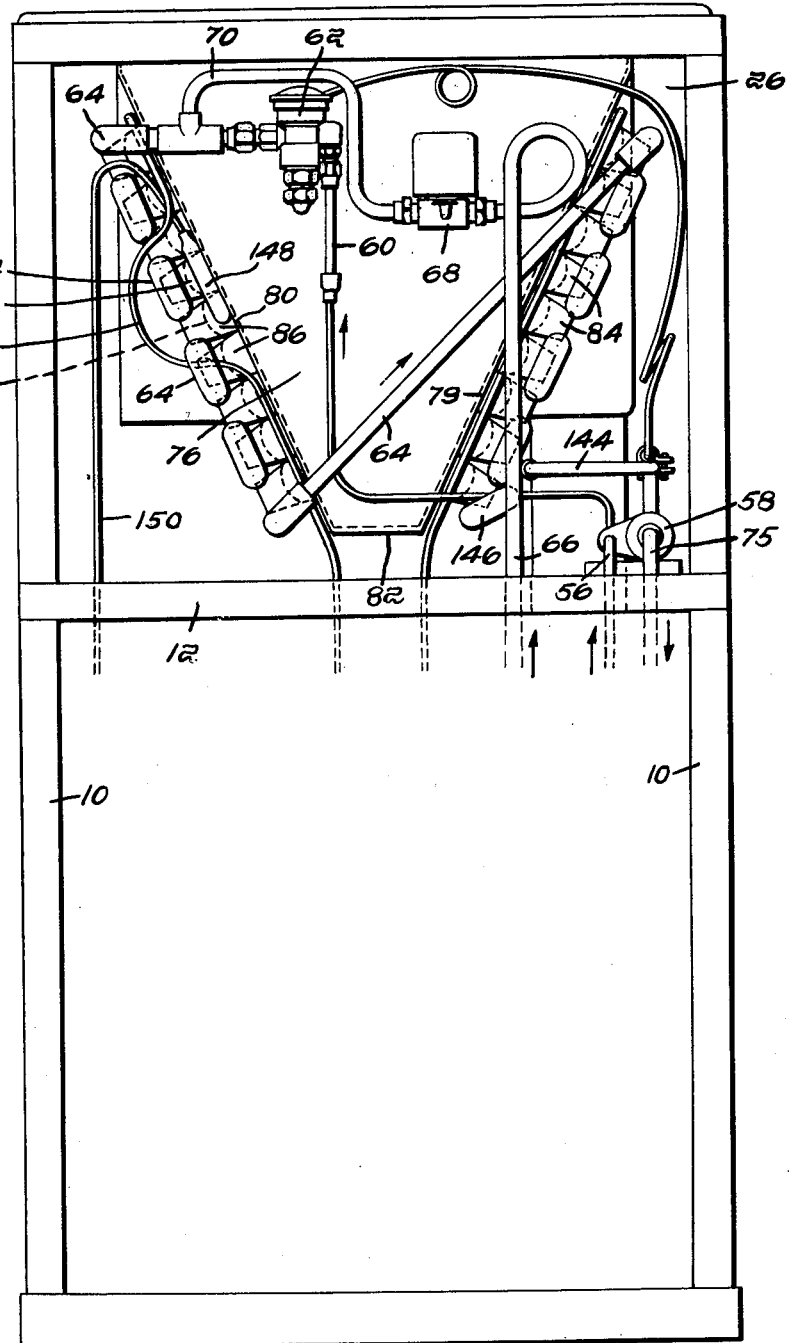
Fig. 7 is a vertical elevation of the end of the unit opposite that shown in Fig. 3 and taken on the line 7—7 of Fig. 2 with the end panels removed to show the interior construction.

As shown schematically in Fig. 9 and in detail in Figs. 5, 6 and 7, the pipe 64 on leaving expansion valve 62 and as can be seen in Fig. 6, runs along the upper sides of the upper row of cups 86 turning at the end of 142 to run in a reverse direction between the adjacent rows of walls of the cups 86 of the first and second rows. Pipe 64 continues its reversing directions downwardly to be positioned against all of the horizontal walls of all of the cups 86 on the sloping wall 80 of the freezing tank. On leaving the bottom row of cups 86, pipe 64 then passes upwardly across the end wall 76 (see Figs. 7 and 9) to traverse in a similar manner the exterior horizontal walls of the cups 84 positioned in the sloping tank side 79. This is shown in Fig. 5, the pipe reversing itself and moving row by row to the bottom row of cups 84 where it finally terminates at pipe 144 leading through the heat exchanger 58 and thence to pipe 75 back to the compressor 48. Pipe 64, where in contact with the cups, is preferably generally oval or egg-shaped in cross-section to facilitate soldering to the cups and to improve the heat-transfer properties.

During the freezing cycle the gas in pipe 64 coming from expansion valve 62 will be sufficiently cold to produce a temperature in the order of 10° F. in the walls of cups 86 and 84. As the distance from expansion valve 62 increases as the pipe passes about the exterior of the various ice freezing cups, it is obvious that the temperature of the gas in pipe 64 will gradually rise as heat is progressively extracted from the ice freezing cups. Therefore, as the pipe 64 reaches the lower and last group of cups 84 as viewed in Fig. 5, there is the possibility in certain situations that there will be insufficient cold in the single run of pipe 64 to produce temperature low enough to cause equal freezing with the other cups which have been engaged by those portions of pipe 64 closer to expansion valve 62. Therefore, in such cases, the pipe 64 may be doubled back for one or more extra turns as at 146 in Figs. 5 and 7 which by applying the then available low temperature at additional points on these last cups will reduce the temperature sufficiently to produce ice cubes substantially equal to those frozen in the cups elsewhere in the tank.

*Thermal control*

In order to inaugurate the freezing cycle and to continue the operation of the freezing cycle until such time as ice cubes of desired size have been frozen, and thereafter to shift automatically to the defrosting cycle to free the ice cubes from the ice freezing cups, there is provided a novel mechanism in the form of a thermal bulb 148 which is so located with respect to the exterior of one of the ice freezing cups that the presence or absence of ice in the cup will result automatically in the shifting of the controls. In other words when there is no ice in the cup against which the thermal bulb 148 is positioned, the temperature will be relatively high and in the vicinity of 32° F. This high temperature will cause shifting of the controls so that the freezing cycle will commence. The freezing cycle will continue until such time as an ice cube has built up within the control ice freezing cup or cups to reduce the temperature of the thermal bulb 148 to a lower predetermined degree. This change in temperature will again cause actuation of the controls so that the machine will go into the defrosting cycle in which heat is applied to the exterior of the ice freezing cups in sufficient quantity to free the cubes from the cups so that they may float to the surface to be harvested in the manner previously explained.

The inauguration of the freezing cycle through the actuation of thermal bulb 148 will now be explained.

*The electrical circuits*

Referring to Fig. 9 the electrical circuits will now be explained. The system in the ordinary case will be operated by the usual 110 volt A. C. current.

The line 154 is connected directly to the circulating pump motor 124 which remains continuously in operation once the line switch has been closed. The line also leads through wire 156 to compressor 48 to the ground. Wire 156 has therein a switch 158 under the control of the storage drawer thermostat. Thus, when the storage drawer 8 becomes full of ice and engages the thermostat 160 located therein, the switch 158 will be opened to stop the compressor which will shut off the machine until such time as switch 158 is thereafter closed through the using or melting of the ice in the storage drawer. It will be assumed for the present, however, that switch 158 remains closed so that the compressor 48 stays in continuous operation along the pump 122.

A parallel circuit 162 in line 156 includes a switch 164 which is open unless closed by actuation of the relay 166. A second circuit 168 also parallel to line 156 includes therein the switch 170 which when the relay 172 is inactive will be in the position indicated at 174 and hence will energize relay 166 to maintain switch 164 in closed position 176. Accordingly, in the absence of energization of relay 172, the switches 164 and 170 will be at positions 176 and 174 during the freezing cycle.

*Freezing cycle control*

With these switches in the aforesaid position, the operation of compressor 48 causes a freezing fluid to be circulated via pipes 52, 56, 60 and expansion valve 62 through pipe 64 about the exterior of the ice freezing cups 84 and 86 thus reducing the temperature of the cups sufficiently below freezing so that ice gradually forms on the lower walls and bottom and builds up along the walls gradually filling the interior of the cup. In due course, the ice building up in the control cup 178 (see Figs. 6 and 7) against which thermal bulb 148 is positioned will cause reduction of the temperature of the thermal bulb to a predetermined temperature which will result in the closing of switch 152 (see Fig. 9). By the time this occurs, ice will also have formed correspondingly in all of the other submerged ice forming cups 84 and 86. Each cube, while formed to full size, will still be confined within its individual cup and when defrosted will be free to float out of its cup without restraint.

Thus, the cup 178 acts as a control for the entire unit by virtue of its causing actuation of switch 152 to institute defrosting only when the ice has been frozen in sufficient volume. By means of an adjustment on switch 152, the temperature at which thermal bulb 148 will cause switch 152 to operate can be reduced or increased. If reduced, the freezing cycle will continue for a longer period until the ice is built up further in control cup 178 to the extent necessary to reduce the temperature of the thermal bulb to its new lower degree of operation.

When switch 152 closes upon the completion of freezing to the desired degree in the control cup 178 and correspondingly in all of the other cups, current will flow from wire 156 through wire 180 through switch 152 through wire 182 and relay 172 to ground. This causes switch 170 to move to the position 184, thus deenergizing relay 166 and causing switch 164 to open.

At the same time current also flows through line 180 through switch 152 through wire 186 to actuate and open solenoid valve 68. Current also flows through wire 188 which is connected with a heating cable 190.

Heating cable 190 as can be seen in Figs. 5 and 6, 7 and 9, and in enlarged detail in Fig. 8 is positioned between the exterior vertical walls of the cups 84 and 86 and running at right angles to the disposition of the pipe 64. Heating cable 190 being of smaller diameter than pipe 64 can be positioned closer to the apex of the walls of the ice forming cups as shown in Fig. 8. Heating cable 190 is of such length and resistance that as soon as its circuit is established by closing of switch 152, the temperature of the cable throughout its length will promptly rise to a predetermined degree which will be in the order of 165° F. The heat of the cable is immediately transferred to the walls of the one hundred and twenty-six cups which are engaged by the cable and at the same time with solenoid valve 68 now open, hot gas coming from the continuously running compressor 48 will flow through hot gas lines 66 and 70 to pipe 64 which had previously received the freezing gas from expansion valve 62.

As a result heat is transferred from pipe 64 to opposed sides of the cups 84 and 86 and heat is transferred from the heating cable 190 to the other opposed sides of the cups and the defrosting cycle is now in operation.

While in Fig. 9 the heating cable 190 is only shown on one side of the tank in cooperation with cups 86, it will be understood that it is similarly arranged to cooperate with cups 84 on the other side of tank 28 as illustrated in Fig. 5.

Within a space of two or three minutes sufficient heat will have been applied to the cups 84 and 86 so as to melt the surface of the ice cube that is in engagement with the cup, thus freeing each ice cube from its cup so that it floats out of the cup and upward to the surface of the water in tank 28. Defrosting proceeds substantially uniformly over all of the cups, but obviously the ice cubes will not be released exactly simultaneously. There are bound to be small time differences and it is therefore necessary to make provision that sufficient time be allowed for the defrosting process to continue until all ice cubes will have floated free. Should a single ice cube remain in one of the cups, then on the next freezing cycle, the ice in that cup, starting with the full size ice cube remaining from the previous cycle, would build up to and above the top edge of the cup and would in time merge with the newly formed ice in the adjacent cups. Then, on the next defrosting cycle, these connected ice cubes would not float free with the result that on each succeeding freezing cycle additional adjacent cubes would be bound together and in time an ice mask would form from all of the cups which would require shutting down of the machine to remove this unwanted ice so that a fresh start could be made. Therefore, in order to insure that each and every ice cube will have adequate time to be defrosted to float free on each defrosting cycle, a special control means is provided.

*Defrosting cycle control*

On referring to Figs. 6 and 7, it is seen that the heating cable 190 does not follow its usual path with respect to the third, fourth, fifth and sixth freezing cups of the right hand row of cups 84. Instead, the heating cable has been led outwardly away from the cups to pass over three horizontal runs of the pipe 164. Thus, the heating cable is entirely out of contact with the fourth cup which is control cup 178 and the fifth cup and only partially in contact with the third and sixth cups. The result of this arrangement is that when the defrosting cycle comes on due to the completion of the freezing of a cube in control cup 178, the right hand sides of the fourth and fifth cups as viewed in Fig. 6 or the near sides of the fourth and fifth cups as viewed in Fig. 7 will not receive heat from the cable 190 although defrosting heat will be applied to the other three sides of these cups by the cable 190 as it passes downwardly between the first and second rows of cups and the pipe 164 which remains in its usual position with respect to all of the cups. Because of this deficiency in defrosting heat due to the diversion of cable 190, those ice cubes in the fourth and fifth cups will be delayed somewhat longer in floating free than all of the other ice cubes to which defrosting heat has been applied to all four sides of their respective cups. Thus, sufficient defrosting time is assured to permit the floating free of all cubes prior to the release of the control cubes in the said fourth and fifth cups. The continued delayed presence of the fourth and fifth cubes within those cups against which is positioned thermal bulb 148 will insure a continuance of the necessary low temperature in the thermal bulb to maintain the switch 152 in closed position thus to continue the defrosting cycle so long as the control cubes remain in their cups. Once the control cubes in those cups engaging thermal bulb 148 have floated free (and they will be the last to be freed), the temperature of the thermal bulb will promptly rise as the slightly warmer water rushes into the control cups from which the ice cubes have just departed. The rise in temperature of the thermal bulb 148 will cause switch 152 to open, thus breaking the circuit through line 182, line 186 and line 188 causing the simultaneous shifting of switch 170 to position 174 the actuation of relay 166 to close switch 164, the closing of solenoid valve 68 so that no more hot gas will be pumped into pipe 64, and the breaking of the circuit through heating cable 190.

As compressor 48 runs continuously through the freezing and defrosting cycles, it now begins to pump the compressed gas through the other circuit, namely, condenser and receiver 54, liquid lines 56 and 60 through expansion valve 62 thus to deliver the freezing fluid to pipe 64 to recommence the freezing cycle.

The freezing cycle then continues until ice has been built up in the control cup 178 to a sufficient depth to lower the temperature of thermal bulb 148 enough to again actuate switch 152. When this occurs, the defrosting cycle is repeated and another one hundred and twenty-six cubes of ice will be harvested and deposited in storage drawer 8.

*Means for insuring the completion of a freezing cycle*

Once a freezing cycle has started, it should run to completion so that the resulting ice cubes will be of the same uniform size as those previously produced. It is possible that during the removal of ice from the unfilled storage drawer, ice might engage the drawer thermostat 160 thereby causing switch 158 to open. This would be the normal procedure when the storage drawer becomes full so that the compressor would then be shut down and the machine remain quiet until such time as ice had been removed from or melted down in the storage drawer. However, since the switch 164 in the parallel circuit 162 closes at the commencement of each freezing cycle and remains closed until the refrosting cycle begins, it is apparent that the opening of switch 158 during a freezing cycle will be ineffective to shut down compressor 48. Accordingly, the freezing cycle once started, will run to completion, but when ended and followed by the defrosting cycle which will likewise run to completion, the next freezing cycle will not resume because switch 158 is open and switch 164 and 174 are likewise open.

As soon as switch 158 recloses through the consumption of ice in the storage drawer 8, compressor 48 recommences operation and the next freezing cycle begins.

It will be observed that the circulating pump 122 must be kept running at all times even though the compressor 48 has stopped due to the storage drawer being full. This is necessary because the volume of the water in the freezing tank 28 above the weir 102 is greater than can be accommodated in the sump 30. This is so because of the limited capacity of the sump in relation to the freezing tank if the overall dimensions of the machines are to be held to a minimum.

If by any mischance the motor 124 should fail so that the water above the weir in the tank overflowed into the sump, the rising water level would simply cause overflow over the sump wall 116 with the water then running down through chute 32 into the storage drawer 8, whence it would drain off through drain 192 that leads from the bottom of the drawer into the sloping drain trough 194 from which the water may be carried away by any convenient means such as a hose connected to the outlet 196.

Storage drawer

The construction of the storage drawer is important as it enables the user to get at the ice readily while always maintaining the drawer under the chute 32 so that if a harvesting cycle should commence while the drawer was open, the ice would still be deposited in the drawer.

The construction of the drawer is as follows: It is insulated on all four sides and the bottom by the hard insulation 34, 36, 38, 40 and 42 previously referred to. A handle 198 is provided to facilitate pulling the drawer open. Two sets of antifriction wheels 46 previously referred to are positioned so that the bottom 200 of the drawer can readily roll thereon. Approximately mid-way of the front to rear dimension of the drawer 8 is a transversely extending flat bar 202 firmly welded or otherwise secured to the frame immediately below the drawer. At the rear end of the drawer centrally located thereof is a hook member 204 of such dimensions that when the drawer is pulled out, the hook member will catch under bar 202, not only acting as a stop, but also as means for preventing the drawer from tilting forward should it become over-balanced when pulled out. This arrangement prevents more than partial withdrawal of the drawer but nevertheless this is adequate for the operator to reach within to remove such ice as is needed. At the same time the back wall of the drawer can never be moved forwardly as far as the chute 32 so that incoming ice will always fall into the drawer.

Such melting of ice as may occur will escape through drain 192 previously referred to. Rearward movement of the drawer beyond its correct closed position is prevented by the engagement of the rear of hook 204 with the frame member 206.

Summary of operation—idle phase

This condition occurs when the storage bin 8 is full of ice cubes and the drawer thermostat 160 causes the contacts of switch 158 to be opened. During this time the only current that is flowing from the line is through the circulating pump motor 124. This action keeps the water in the freezing tank in a fresh and agitated condition ready for a freezing cycle whenever the ice cube level falls below the sensitive bulb 160 of the drawer thermostat. The circulating pump 122 runs continuously unless the main current switch is disconnected.

Freezing phase

When the storage drawer thermostate 160 functions to close switch 158 to begin a freezing operation, current flows from the line through the compressor 48 to the ground starting the refrigeration system. At the same time current flows from the line 156 through wire 168, through the position 174 of switch 170 to the relay 166 to close switch 164 thereby establishing a holding circuit around switch 158 whereby current from the line continues to flow to compressor 48 and the relays even though the switch 158 may be thereafter opened by the accidental positioning of ice against thermal bulb 160. Thus, the freezing phase will continue to completion without interruption.

Harvesting phase

After the ice cubes have been fully formed the contacts in switch 152 are closed by the lowered temperature in thermal bulb 148 conducting current from the line 156 to the relay 172 of the double throw switch 170 moving its contact arm from position 174 to position 184. Thus, the compressor 48 continues to operate although it now produces a heating instead of a cooling effect for harvesting the ice, because the solenoid valve 68 has been opened by current reaching it through the now closed switch 152. Similarly, the electric heating cable 190 is turned on to cooperate with the hot gases passing through pipe 64 to release the ice cubes. It should also be noted that when the contacts of switch 170 have changed position at the beginning of the harvesting phase, the current through relay 166 is interrupted, thus opening switch 164. During the harvesting phase, it does not matter whether the switch 158 is opened or closed.

When the ice cubes have been released and washed over the weir 102 to the storage drawer, the temperature of thermal bulb 148 rises to open the contacts of switch 152 cutting off the current to relay 172 thus permitting the switch 170 to return to its normal position at 174. If at this time the storage drawer 8 is full, causing the switch 158 to be opened, the entire system becomes idle except for circulating pump 122. However, if the storage drawer 8 is not full at the completion of a cycle, the switch 158 remains closed and a new freezing cycle will be inaugurated.

Figure 11:
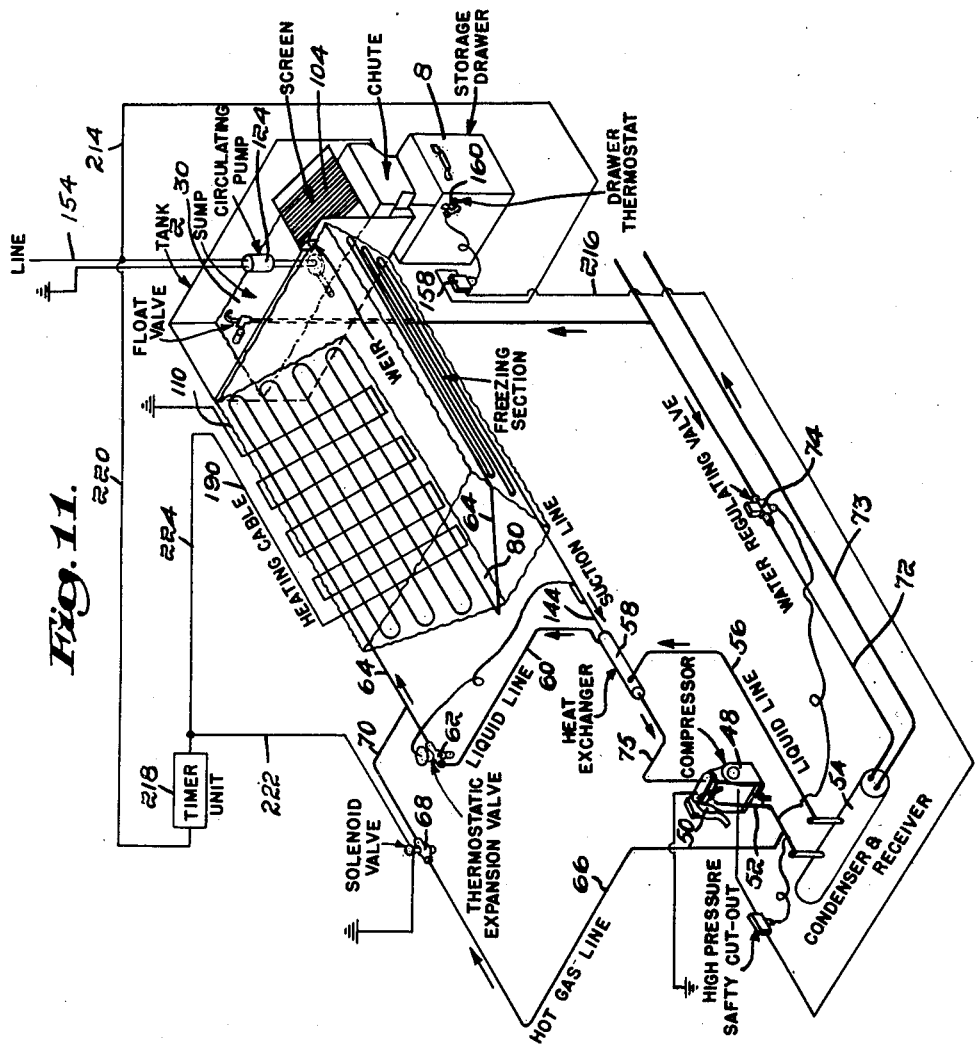
Fig. 11 is a schematic view similar to Fig. 9, showing another form of electrical circuits which may be used to control the institution of the freezing and defrosting cycle.

Alternate control means for starting and stopping freezing and defrosting cycles Fig. 11 illustrates another electrical circuit for controlling the operation of the ice making machine. The electrical system of Fig. 11 is similar to that of Fig. 9 in some respects but utilizes different means for initiating and terminating the freezing and defrosting cycles.

In this embodiment electrical power is again supplied to circulating pump motor 124 through power line 154. Line 154 is connected through wire 214 to storage drawer switch 158. As in the system of Fig. 9, switch 158 is controlled by thermostat 160. Switch 158 is connected to compressor 48 by line 216.

A timer unit 218 is also connected to power line 154, being connected thereto by line 220. Timer unit 218 is also connected to solenoid valve 68 and heating cable 190 by means of lines 222 and 224 respectively. Timer unit 218 comprises an electrical switch and a clock mechanism for actuating the switch. When the switch embodied in timer unit 218 is closed, current flows from line 154 to solenoid valve 68 and heating cable 190, causing valve 68 to open whereby hot gas is returned from compressor 48 to pipe 64 through lines 66 and 70, and energizing heat cable 190 to provide additional heat for the defrosting cycle. When the switch in the timer unit opens, current flow through lines 222 and 224, is terminated and valve 68 closes shutting off the flow of hot gas from the compressor to pipe 64. Heating cable 190 is simultaneously deenergized. As a consequence the defrosting cycle is terminated and another freezing cycle is started.

Any conventional timer unit having a switch actuated by a clock mechanism may be employed provided, however, that the unit be adjustable to provide lengthening or shortening of the freezing and defrosting cycles as desired or required. It has been found that the present machine will operate with economy and produce a satisfactory product when the timer unit is set to provide a freezing cycle lasting about fifty minutes and a defrosting cycle lasting about ten minutes. However, it is recognized that the size of the ice cubes can be increased or decreased by correspondingly increasing or decreasing the duration of the freezing cycle. Furthermore, the machine may be affected by the atmospheric conditions prevailing at the site of the machine and, as a result, the freezing time may have to be adjusted to compensate for abnormal atmospheric conditions.

As previously stated, the ice cubes are not all released simultaneously, and while some of the cubes may be released from their cups after two or three minutes of defrosting, others may require considerably longer. For this reason, the time for completion of the defrosting cycle is made slightly longer than the time required for the last ice cube to be released. As indicated above, this is usually no greater than ten minutes and, in some cases, may be considerably less.

When thermostat 160 in storage drawer 8 causes switch 168 to open, the flow of current in line 216 terminates and compressor motor 50 immediately ceases to operate despite the fact that the machine is in the middle of a freezing or defrosting cycle. For this reason, the system of Fig. 9 is preferred since it includes holding circuits that delay cessation of current flow to compressor 48 until the freezing and defrosting cycles are completed.

It is my intention to cover all changes and modifications of the example of the invention herein chosen for purposes of the disclosure which do not constitute departures from the spirit and scope of the invention.

I claim:

1. An ice cube making machine comprising a tank for receiving water, a sump, a pump for pumping water continuously from said sump into the top portion of said tank, a plurality of ice freezing cups located in the walls of said tank, refrigeration means for simultaneously reducing the temperature of all said cups below freezing during each freezing cycle, defrosting means for simultaneously raising the temperature of all said cups above freezing during each defrosting cycle, means for stopping the operation of said refrigerating means after ice has been frozen to a required depth in said freezing cups and for putting said defrosting means in operation for a period long enough to free from said cups all of the ice cubes frozen in said cups during the freezing cycle whereby said ice cubes will then float on the water in said tank, a weir at one side of said tank over which tank water supplied by said pump flows continuously during both the freezing and defrosting cycles, means for directing said overflowing tank water to said sump, said overflowing tank water acting to remove all floating ice cubes from said tank, means for deflecting said ice cubes from the water falling from said weir to a collection point and a pipe leading from said pump to said tank and having its exit end close to the surface of the tank water and directed toward a corner of the tank opposite the said weir so as to cause continuous movement of all of the water in said tank and generally rotary movement of the surface water whereby all floating ice cubes will be carried to and over said weir.

2. An ice cube making machine comprising a tank for receiving water, a sump, a pump for pumping water continuously from said sump into the top portion of said tank, a plurality of ice freezing cups located in the walls of said tank, refrigeration means for simultaneously reducing the temperature of all said cups below freezing during the freezing cycle, defrosting means for simultaneously raising the temperature of all said cups above freezing during the defrosting cycle, said refrigeration means comprising a pipe in contact with said freezing cups and containing a low temperature refrigerant during the freezing cycle and said defrosting means comprising the same said pipe having therein a hot fluid and in addition an electric heating cable in engagement with said cups operating simultaneously with the hot fluid in said pipe, means for stopping the operation of said refrigerating means after ice has been frozen to a required depth in said freezing cups and for putting said defrosting means in operation for a period long enough to free from said cups all of the ice cubes frozen in said cups during the freezing cycle whereby said ice cubes will then float on the water in said tank, a weir at one side of said tank over which tank water supplied by said pump flows continuously during both the freezing and defrosting cycles, means for directing said overflowing tank water to said sump, said overflowing tank water acting to remove all floating ice cubes from said tank, and means for deflecting said ice cubes from the water falling from said weir to a collection point.

3. An ice cube making machine as set forth in claim 2, in which said pipe engages each of said cups on one pair of opposite sides and said electric heating cable engages said cups on the other pair of opposite sides at a position closer to the tops of said cups than said pipe.

4. An ice cube making machine as set forth in claim 2, said pipe being generally oval in cross section and secured to each of said cups by solder.

5. An ice cube making machine comprising a tank for receiving water, a sump, a pump for pumping water continuously from said sump into the top portion of said tank, a plurality of ice freezing cups located in the walls of said tank, refrigeration means for simultaneously reducing the temperature of all said cups below freezing during each freezing cycle, defrosting means for simultaneously raising the temperature of all said cups above freezing during each defrosting cycle, means for stopping the operation of said refrigerating means after ice has been frozen to a required depth in said freezing cups and for putting said defrosting means in operation for a period long enough to free from said cups all of the the ice cubes frozen in said cups during the freezing cycle whereby said ice cubes will then float on the water in said tank, a weir at one side of said tank over which tank water supplied by said pump flows continuously during both the freezing and defrosting cycles, means for directing said overflowing tank water to said sump, said overflowing tank water acting to remove all floating ice cubes from said tank, means for deflecting said ice cubes from the water falling from said weir to a collection point and a pipe leading from said pump to said tank and having its exit end close to the surface of the tank water and directed toward a corner of the tank opposite the said weir so as to cause continuous movement of all of the water in said tank and generally rotary movement of the surface water whereby all floating ice cubes will be carried to and over said weir, said weir being formed by a channel having an upwardly sloping bottom and oppositely disposed side walls.

6. An ice cube making machine as defined by claim 2, wherein the means for starting and stopping said refrigeration and defrosting cycles comprises a timer-actuated switch and a solenoid valve.

7. An ice cube making machine comprising a tank for receiving water, a sump, a pump for pumping water continuously from said sump into the top portion of said tank, a plurality of ice freezing cups located in the walls of said tank, refrigeration means for simultaneously reducing the temperature of all said cups below freezing during each freezing cycle, defrosting means for simultaneously raising the temperature of all said cups above freezing during each defrosting cycle, means for stopping the operation of said refrigerating means after ice has been frozen to a required depth in said freezing cups and for putting said defrosting means in operation for a period long enough to free from said cups all of the ice cubes frozen in said cups during the freezing cycle whereby said ice cubes will then float on the water in said tank, a weir at one side of said tank over which tank water supplied by said pump flows continuously during both the freezing and defrosting cycles, means for directing said overflowing tank water to said sump, said overflowing tank water acting to remove all floating ice cubes from said tank, means for deflecting said ice cubes from the water falling from said weir to a collection point and a pipe from said pump extending into the tank at the side at which said weir is located and through which water is fed to said tank.

8. An ice cube making machine as defined by claim 7, said pipe being directed toward a corner of the tank away from said weir.

9. An ice cube making machine comprising a tank with oppositely disposed sloping walls each having therein below the water surface a plurality of ice-freezing cups, said cups being arranged in horizontal rows and aligned vertically according to the slope of said walls, means for alternately applying freezing and defrosting temperatures to said cups whereby ice cubes will be produced in said cups and then released to float on the water, a weir in one of the walls of said tank over which water may continuously flow, a sump for receiving said overflowing water, a pump for returning water from the sump to the tank and means for causing continuous surface rotational movement of said water and simultaneously causing sufficient movement of the sub-surface water to produce clear ice, the wall in which said weir is located being at one end of said sloping walls and said weir being located along the center line dividing said sloping walls.

10. An ice cube making machine comprising a tank with oppositely disposed sloping walls each having therein below the water surface a plurality of ice-freezing cups, said cups arranged in horizontal rows and aligned vertically according to the slope of said walls, means for alternately applying freezing and defrosting temperatures to said cups whereby ice cubes will be produced in said cups and then released to float on the water, a weir in one of the walls of said tank over which water may continuously flow, a sump for receiving said overflowing water, a pump for returning water from the sump to the tank and means for causing continuous surface rotational movement of said water and simultaneously causing sufficient movement of the sub-surface water to produce clear ice, the said means for causing rotational movement of said water comprising a pipe extending into said tank aimed to direct water from said pump horizontally close to the water surface of the tank along and slightly toward one of the tank walls, said pipe extending into the tank through the same wall in which said weir is located.

11. An ice cube making machine as defined by claim 10 said pipe being directed toward a corner of the tank away from said weir.

References Cited in the file of this patent

UNITED STATES PATENTS

| | | |
|---|---|---|
| 703,315 | Smith | June 24, 1902 |
| 1,219,897 | Althoff | Mar. 20, 1917 |
| 2,080,639 | Taylor | May 18, 1937 |
| 2,250,960 | Kitto | July 29, 1941 |
| 2,563,093 | Bayston | Aug. 7, 1951 |
| 2,575,892 | Roberts | Nov. 20, 1951 |
| 2,583,294 | Erickson | Jan. 22, 1952 |
| 2,595,588 | Lee | May 6, 1952 |
| 2,629,986 | Roberts | Mar. 3, 1953 |
| 2,672,016 | Muffly | Mar. 16, 1954 |

FOREIGN PATENTS

| | | |
|---|---|---|
| 179,899 | Great Britain | Apr. 11, 1923 |